United States Patent [19]
Fujiwara et al.

[11] Patent Number: 4,961,008
[45] Date of Patent: Oct. 2, 1990

[54] POWER REDUCTION DURING POWER DOWN

[76] Inventors: Toshiaki Fujiwara, 759-22, Sugawara-cho, Nara-shi, Nara-ken; Chieji Katoh, 492, Minosho-cho, Yamatokoriyama-shi, Nara-ken, both of Japan

[21] Appl. No.: 291,226

[22] Filed: Dec. 28, 1988

[30] Foreign Application Priority Data

Dec. 29, 1987 [JP] Japan .......................... 62-199191[U]

[51] Int. Cl.$^5$ .................. H03K 3/01; H03K 5/13
[52] U.S. Cl. .................. 307/296.3; 307/592; 364/707
[58] Field of Search ............... 307/296.3, 592; 364/187, 268, 268.1, 268.2, 273.1, 707, 948.8

[56] References Cited

U.S. PATENT DOCUMENTS

| | | | |
|---|---|---|---|
| 4,381,552 | 4/1983 | Nocilini et al. | 364/707 |
| 4,665,536 | 5/1987 | Kim | 377/16 |
| 4,825,143 | 4/1989 | Cheng | 364/707 |

OTHER PUBLICATIONS

"Floating Op-Amp Regulator", p. 32, Kendall Webster Sessions IC Schematic Source Book, John Wiley & Sons, 1978.

*Primary Examiner*—Stanley D. Miller
*Assistant Examiner*—Richard Roseen

[57] ABSTRACT

An electrical circuit is powered by a power supply. There is a first operating circuit which is always energized with electrical power from the power supply. The first operating circuit is operatively connected to a power reducing device. There is a second operating circuit which can, for example, operate the processing portion of a small appliance, such as an electronic calculator. The second operating circuit receives power from the power supply, but is not energized at all times. That is, the second operating circuit is energized with electrical power from the power supply when it is required to run the processing portion of the small appliance. When the small appliance is not run, the second operating circuit does not operate. There is, for an example, an ON/OFF switch on the electrical appliance, to turn the power supply on and off.

10 Claims, 5 Drawing Sheets

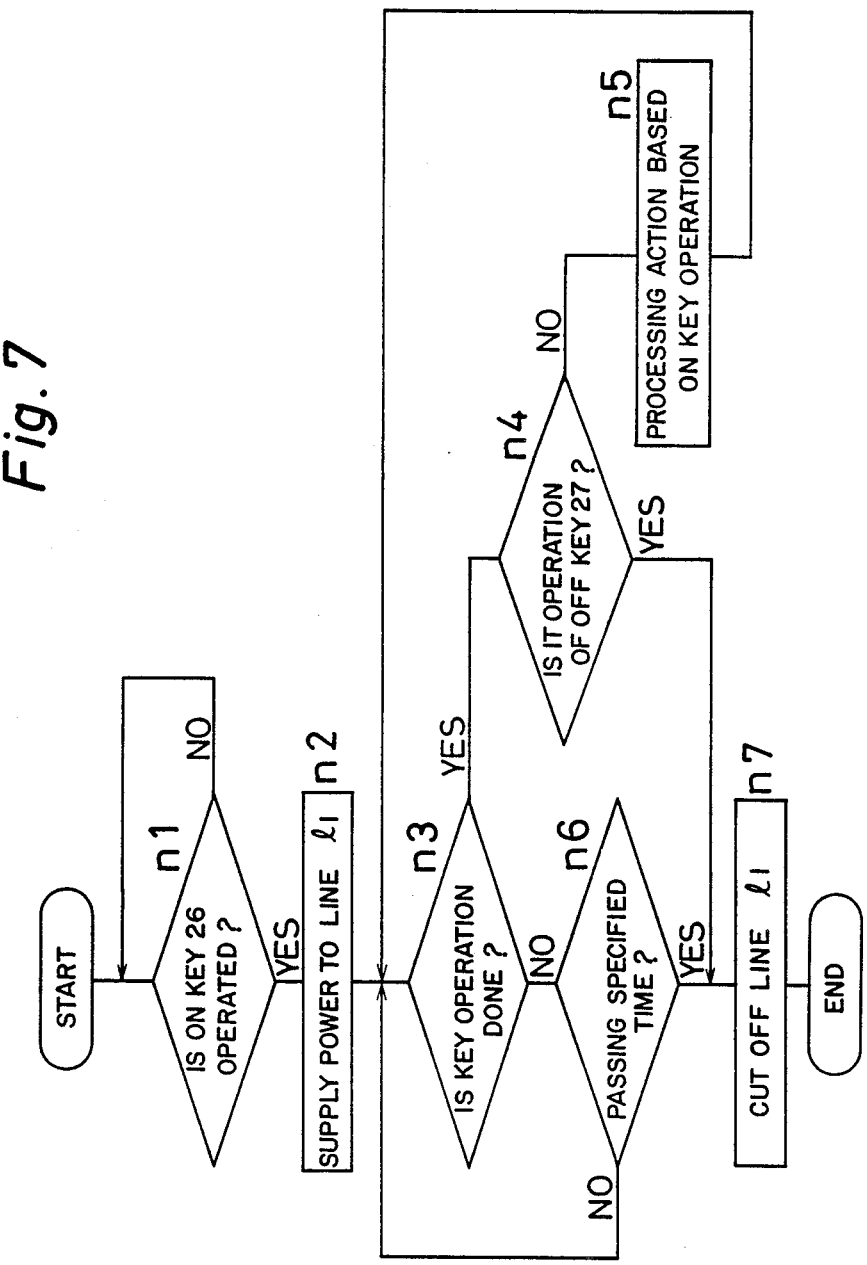

POWER REDUCTION DURING POWER DOWN

BACKGROUND OF THE INVENTION

1. Field of the Invention

This invention relates to an electric circuit preferably used in an electronic appliance, which has a circuit which is always supplied with an electric power and always operates, and a circuit which contains a non-operating period, that is, a period not supplied with electric power. An ultimate purpose of the electric circuit is for saving power consumption.

2. Prior Art

Electronic pocket calculators and so-called electronic notebooks, that include a clock function contain a clock circuit that must be always operated, and a circuit having an non-operating period, such as a processing circuit or central processing unit for controlling such clock circuit.

FIG. 1 is a block diagram showing a basic structure of an electric circuit 1 of the prior art containing the above-mentioned circuits. The electric circuit 1 contains a processing circuit 2 for performing various processing functions, a clock circuit 3, and a power supply 4. When a positive supply voltage $Vs > 0$ is generated from the power supply 4 and each circuit in the electric circuit 1 is supplied with a positive voltage power, the operation is as follows.

The processing circuit 2 and clock circuit 3 are energized by the power supply 4. The time clocked by the clock circuit 3 is read out by the processing circuit 2 through line lc, and is displayed in a display unit (not shown) such as liquid crystal display device. The supply voltage Vs supplied from the power supply 4 through line la is selected at a voltage higher than the minimum operating voltage of the processing circuit 2. This supply voltage Vs is also supplied to the clock circuit 3 through line lb.

When the power is turned on, the peak value of the signal delivered to the processing circuit 2 through line lc from the clock circuit 3 is determined by the supply voltage Vs applied to the clock circuit 3, and therefore in order to transmit the signal securely to the processing circuit 2, the clock circuit 3 must be energized with a relatively high voltage approximately equal to the supply voltage Vs. Therefore, the clock circuit 3 which is usually at a relatively low operating voltage is also energized with the supply voltage Vs.

In such electric circuit 1, when the power is cut off, for example, the line la is cut off for supplying electric power to the processing circuit 2 from the power supply 4. At this time, since the clock circuit 3 must always clock the time, the supply voltage Vs is applied to the clock circuit 3 from the power supply 4 through line lb even while the power to the processing circuit 2 is cut off.

Therefore, the clock circuit 3 is energized with a relatively high voltage of the supply voltage Vs although its operating voltage is relatively low, and the power consumption is increased.

In such electric circuit 1, therefore, the power consumption increases, and when used, for example, in a portable electronic device, the power consumption of the battery used as the power supply 4 increases and the battery must be replaced very often. In addition, when a supply voltage of negative voltage is generated from the power supply 4, and each circuit in the electric circuit 1 is energized with a negative voltage, the same problem occurs.

SUMMARY OF THE INVENTION

It is hence a primary object of this invention to present an electric circuit solving the above-discussed problems and which saves power consumption.

To achieve the above object, the electric circuit of the invention includes:
a power supply; and
power reducing means for reducing the electric power from the power supply.

There is a first operating circuit for delivering a signal, always energized with the electric power from the power reducing means.

Also there is included level converting means for converting to increase crest value of the signal from the first operating circuit, energized with an electric power from the power supply; as well as a second operating circuit for operating in response to the signal from the level converting means, energized with an electric power from the power supply in one period, and not energized with electric power from the power supply in the other period.

According to the invention, the second operating circuit which does not operate in one period, is energized by the power supply. The electric power given from the power supply to the first operating circuit is reduced by the power reducing means. From the first operating circuit, a signal which is converted in level by the level converting means is delivered to the second operating circuit. Therefore, in the non-operating period of the second operating circuit, the first operating circuit is operated by an electric power reduced by the power reducing means, and its power consumption may be notably saved. On the other hand, in the operating period of the second operating circuit, a signal of a small crest value is delivered from the first operating circuit because its applied electric power is relatively low. This signal is converted in level by the level converting means, and is given to the second operating circuit. Therefore, by increasing the crest value of the signal from the first operating circuit and converting into a signal that can be recognized in the second operating circuit, the signal can be transmitted securely.

In a preferred embodiment of the invention, moreover, the level converting means is changed over to the operating state or non-operating state, corresponding respectively to the operating state or non-operating state of the second operating circuit.

Therefore, when the power is cut off, the second operating circuit and level converting means can be set in non-operating state, and the power-saving effect may be further enhanced.

Or if the second operating circuit can recognize a signal of peak value from the first operating circuit, the level converting means may be omitted, and the signal from the first operating circuit may be directly applied to the second operating circuit.

In a different preferred embodiment of the invention, the first operating circuit is a clock circuit which always operates to clock the time.

In a further preferred embodiment of the invention, the power reducing means is constant voltage generating means, which constant voltage generating means includes: means for generating a reference voltage. There is means for detecting the voltage applied to the first operating circuit and means for changing the impedance in response to a control signal, placed between the power supply and second operating circuit.

Also included is a comparator circuit for responding to the output of the reference voltage generating means and the output from the voltage detecting means and for sending a control signal to the impedance changing means so as to vary the impedance of the impedance changing means so that difference between the outputs is zero.

Such constant voltage generating means can be composed, for example of CMOS, and its power consumption can be held at an extremely low level.

In a still different preferred embodiment of the invention, the level converting means includes a switching element for conducting or cutting off in response to the signal from the first operating circuit; and an impedance element connected in series to the switching element.

There is a series circuit composed of the switching element and the impedance element being connected to the power supply, and the output at the connection point of the switching element and impedance element being applied to the second operating circuit.

An electric circuit of the invention further includes a power supply; power reducing means for reducing the electric power from the power supply and a first operating circuit which is always energized with the electric power from the power reducing means and delivers a signal.

Also, there is a second operating circuit for operating in response to a signal from the first operating circuit, energized with an electric power from the power supply in one period, and not energized with electric power from the power supply in the other period.

Thus, this invention may be preferably applied in the portable electronic appliances in which low power consumption is desired, such as electronic pocket calculator and so-called electronic notebook having a clock function.

BRIEF DESCRIPTION OF THE DRAWINGS

The features and the benefits of this invention, as well as these and other objects, will be more clearly understood and appreciated from the following detailed description taken in conjunction with the accompanying drawings, in which:

FIG. 7 is a flow chart for explaining the operation of the information processing apparatus 11.

DETAILED DESCRIPTION OF THE PREFERRED EMBODIMENTS

Figure 1:
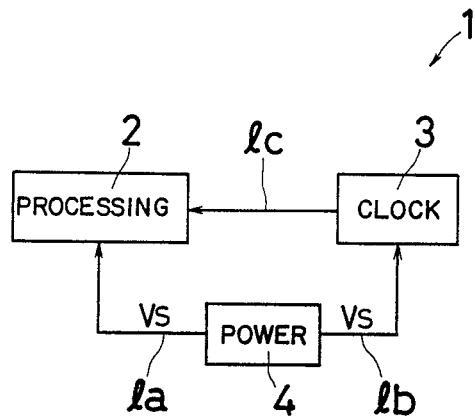
FIG. 1 is a block diagram showing a basic structure of an electric circuit 1 of the prior art.

Referring now to the drawings, preferred embodiments of the invention are described herein.

Figure 2:
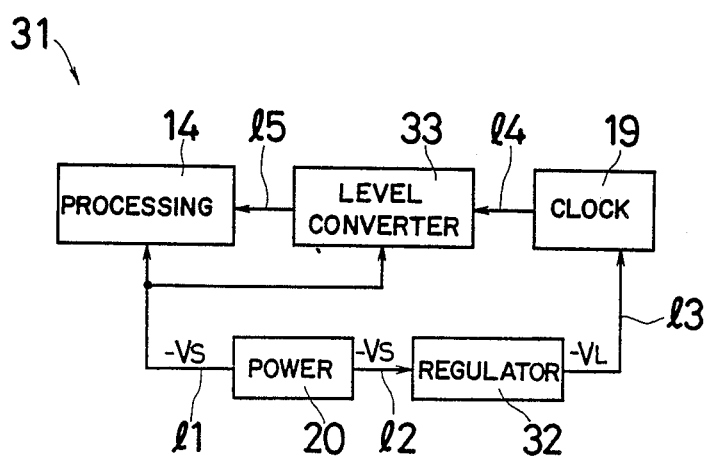
FIG. 2 is a block diagram showing a basic structure of an electric circuit 31 in one of the embodiment of the invention.
Figure 3:
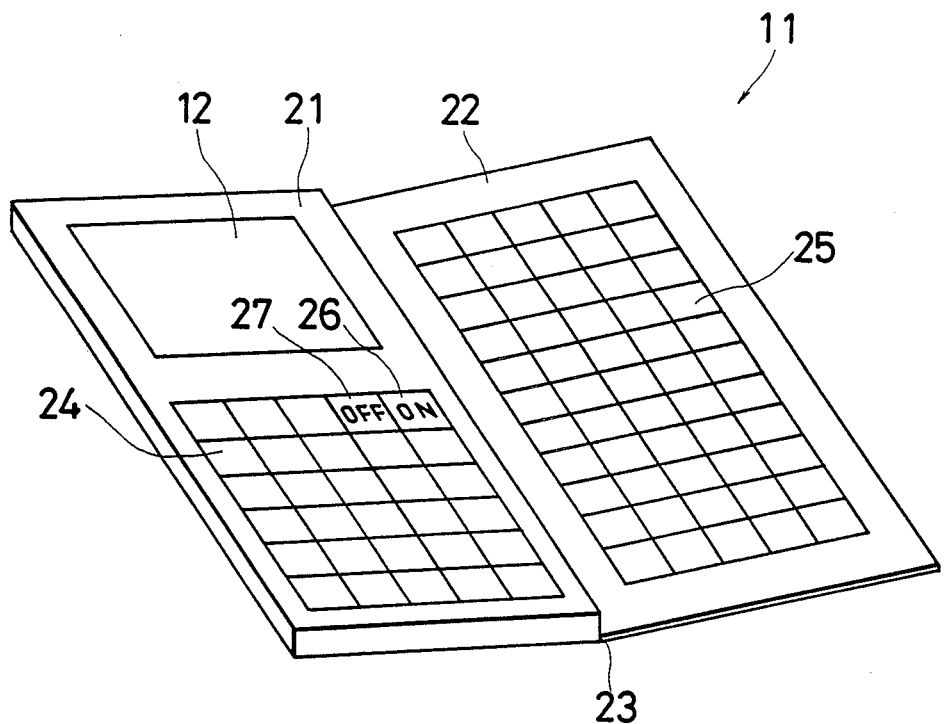
FIG. 3 is a perspective view of the appearance of an information processing apparatus 11.

FIG. 2 is a block diagram showing the structure of an electric circuit 31 in an embodiment of the invention, and FIG. 3 is a perspective view showing the appearance of an information processing apparatus 11 containing the electric circuit 31. In FIG. 3, the information processing apparatus 11 is an electronic appliance of a pocket calendar size, and it possesses the calendar display function, schedule list function including the date and items, telephone number list function, memo function for storing a few characters, Chinese character diction function and computing function.

The information processing apparatus 11 is composed of a main body 21, a cover 22, and a linkage part 23 for coupling them. The main body 21 comprises a display unit 12 and a first key input unit 24, and the cover 22 contains a second key input unit 25. The first key input unit 24 contains ON key 26 and OFF key 27 for turning on and off the power supply.

Figure 4:
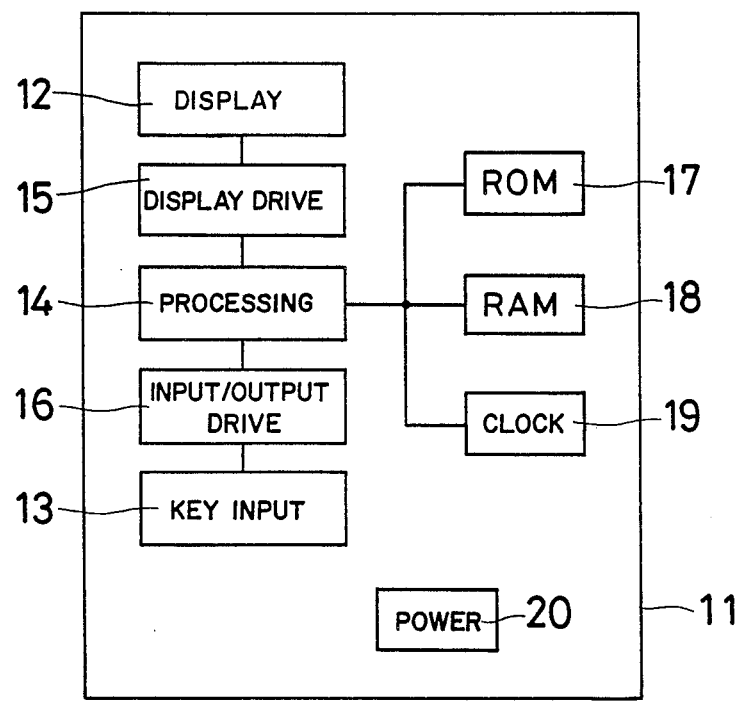
FIG. 4 is a block diagram showing an electric composition of the information processing apparatus 11 containing the electric circuit 31.

FIG. 4 is a block diagram showing an electric composition of the information processing apparatus 11. The information processing apparatus 11 contains, for example, a display unit 12 which is realized by liquid crystal display device or the like, and a key input unit 13 comprising the first key input unit 24 and second key input unit 25. These are controlled and scanned by a processing circuit 14 realized by microprocessor or the like, by way of a display drive unit 15 and an input/output drive unit 16. The information processing apparatus 11 contains a read-only memory (ROM) 17 in which the operation programs of the processing circuit 14 and others are stored, and a random access memory (RAM) 18 in which various pieces of data are stored, and they are controlled in reading/writing by the processing circuit 14. The clock signal and the present time for defining the action timing in such control are delivered from a clock circuit 19, and a power supply 20, which is a direct-current power source realized by various batteries, energizes the information processing apparatus 11 with electric power.

FIG. 2 is a block diagram showing the composition of the electric circuit 31 relating to the power supply to the information processing apparatus 11. The electric circuit 31 is composed of processing circuit 14 which is a second operating circuit, a clock circuit 19 which is a first operating circuit, a power supply 20, a regulator 32 which is power reducing means, and a level converter 33 which is level converting means and is realized by transistor or amplifier. Each electric circuit represented by the processing circuit 14 is not required to operate after the power is cut off, for example, by pressing the OFF key 27 as shown in FIG. 3. However, the clock circuit 19 must always clock the time and must be in operating state even if the power is cut off, otherwise the clock would not operate.

When a negative voltage is generated from the power supply 20 as a supply voltage $-V_s$ ($V_s > 0$), and the circuits in the electric circuit 31 are operated by the negative voltage, the operation becomes as follows. The absolute value of the lowest operating voltage of the processing circuit 14 is relatively high, and it is energized with electric power at supply voltage $-V_s$ supplied from the power supply 20 through line 11. The supply voltage $-V_s$ is, when the supply voltage from the power supply 20 is a negative voltage, for example, $-5$ V to $-6$ V.

The clock circuit 19 can be operated at a lower supply voltage in the absolute value than that of the processing circuit 14, for example, at a voltage of about $-3$ V. The signal level delivered from the clock circuit 19 at this time is limited by the voltage supplied to the clock circuit 19, and therefore when the clock circuit 19 is operated at a lower voltage (e.g. −3 V) in absolute value, the peak value of the delivered signal is lower.

In the electric circuit 31, the supply voltage −Vs from the internal power supply is applied to the processing circuit 14 through line 11, and is also fed to the regulator 32 through line 12. The regulator 32 contains constant voltage generating means using, for example, semiconductor element, and a voltage −$V_L$ of which absolute value is smaller than the supply voltage −Vs is generated, and is supplied to the clock circuit 19 through line 13. The voltage −$V_L$ is selected to satisfy the relation of Vs>$V_L$>0, and it is, for example, about −3 V.

Since the clock circuit 19 is operated by this voltage −$V_L$, the power consumption in the clock circuit 19 is reduced. As a result, the crest value of the signal delivered from the clock signal 19 to line 14 is smaller than the peak value of the signal to be fed into the processing circuit 14. The level converter 33 converts the signal level from the clock circuit 19, and increases its crest value and applies the signal to the processing circuit 14 through line 15. Thus, the signal from the clock circuit 19 is securely recognized in the processing circuit 14.

Figure 5:
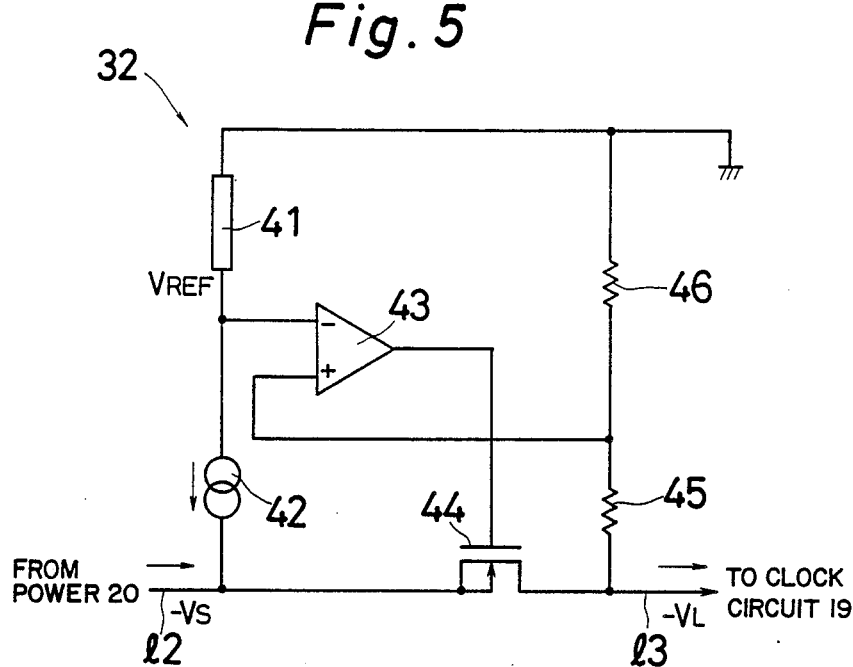
FIG. 5 is a electric circuit diagram showing the structure of a voltage regulator 32 of the electric circuit 31.

FIG. 5 is an electric circuit diagram showing a structural example of the regulator 32 of the electric circuit 31. The regulator 32 contains an impedance element 41 for generating a reference voltage $V_{REF}$ such as resistance, a constant current source 42, a differential amplifier 43, a field effect transistor 44 which is a semiconductor element, and resistances 45, 46. The supply voltage −Vs supplied from the power supply 20 through line 12 is applied to one end of the constant current source 42, and is also given to the source of the transistor 44. The other end of the constant current source 42 is connected to the inverting input terminal of the differential amplifier 43 and one end of the impedance element 41. The other end of the impedance element 41 is grounded. The drain of the transistor 44 is connected to the line 13 to the clock circuit 19, and is also grounded by way of the resistances 45, 46, and the connection point of the resistances 45, 46 is connected to the noninverting input terminal of the differential amplifier 43. The output of the differential amplifier 43 is given to the gate of the transistor 44.

In such regulator 32, a negative voltage of, for example, about −5 V is applied as supply voltage −Vs from the power supply 20 through line 12.

At the inverting input terminal of the differential amplifier 43, moreover, the reference voltage $V_{REF}$ from the impedance element 41 is fed, and at the noninverting input terminal, a potential of the voltage $V_L$ of line 13 divided down by the resistances 45, 46 is given. Comparing these potentials, a control signal having a voltage value corresponding to the potential difference is delivered. By this control signal, the drop voltage between the source and drain of the transistor 44 is controlled so as to keep the relation of −$V_L$=$V_{REF}$. In this way, the line 13 voltage −$V_L$ is kept constant.

For the sake of simplicity, for example, a load resistance $R_L$ is applied to the clock circuit 19 in the following explanation. Without using regulator 32, a supply voltage −Vs is applied to the clock circuit 19 directly from the power supply 20, and the clock circuit 19 is operated. In this case, the voltage consumption P1 in the clock circuit 19 is expressed as follow.

$$P1 = \frac{V_S^2}{R_L} \quad (1)$$

When the regulator 32 is used, on the other hand, since the current flowing in the constant current source 42 and impedance element 41 and the current flowing in the resistances 45, 46 are very small, for example, less than 1.0 μA, ignoring their power consumptions, the electric power P2 consumed by the regulator 32 and the clock circuit 19 may be expressed as follows.

$$P2 = \frac{V_S^2}{R_L + \Delta R} \quad (2)$$

where ΔR is the change of voltage between the source and drain of transistor 44.

Apparently from equations (1) and (2), the relation is P1>P2, and by using the regulator 32, it is known that the power consumption is effectively saved in the electric circuit 31.

Figure 6:
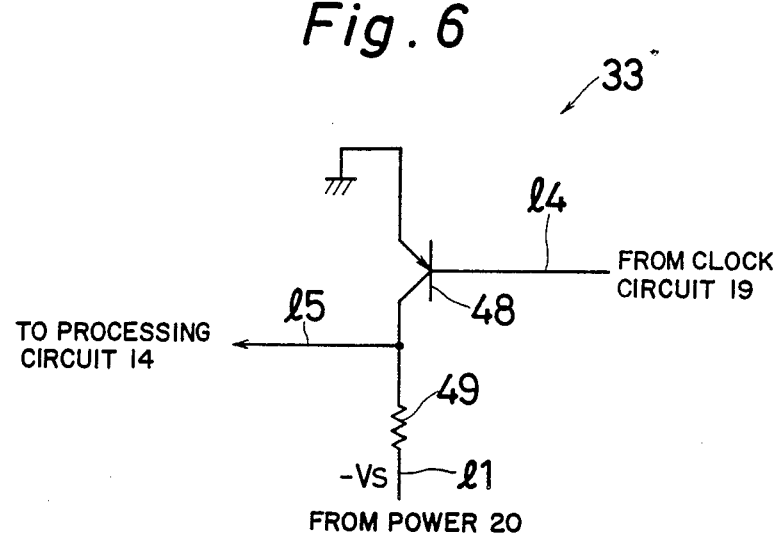
FIG. 6 is an electric circuit diagram showing a structural example of a level converter 33.

FIG. 6 shows a structural example of the level converting circuit 33. The level converter 33 contains, for example, PNP type transistor 48 and resistance 49. The signal sent out from the clock signal 19 to line 14 is fed to the base of the transistor 48. The emitter of the transistor 48 is connected to the line 15, and is grounded through the resistance 49. To the connector of the transistor 48, a supply voltage −Vs is applied from the power supply 20 through the line 11.

The output signal from the clock circuit 19 which is operated at voltage −$V_L$ is limited in the signal within a voltage range of −$V_L$ to 0 V, for example when $V_L$=3 V, −3 V to 0 V, that is, the crest value of 3 V. For example, when a signal of 0 V is sent out to the line 14, the emitter and collector of the transistor 48 are in a nonconductive state, and a signal of supply voltage −Vs (=−5 V) of the line 11 is led out to the line 15. When a signal of −3 V is sent out to the line 14, the emitter and collector of the transistor 48 are in conducting state, and the potential of the line 15 becomes 0 V. Thus, by the level converter 33, signals of −Vs to 0 V, for example, −5 V to 0 V in voltage range, that is, signals having the crest value of 5 V are delivered to the processing circuit 14 through line 15. Therefore, the signal from the clock circuit 19 is securely recognized by the processing circuit 14.

FIG. 7 is a flow chart for explaining the action of an information processing apparatus 11 in an embodiment of the invention. In FIG. 7, when the ON key 26 is pressed in the power interrupted state, the operation moves from step n1 to n2, and a supply voltage −Vs is fed from the power supply 20 to the processing circuit 14 and level converter 33 through line 11, and the information processing apparatus 11 waits for input. At this time, the supply voltage −Vs is always given to the regulator 32 from the power supply 20 through line 12 regardless of the operation of the ON key 26.

At step n3, whether key operation is done or not at the key input unit 13 is judged. If the key operation has been done, the operation moves to step n4, and if the operated key is the OFF key 27 or not is judged. If any other key than the OFF key 27 has been operated, the operation moves to step n5, and the processing action corresponding to the operated key is carried out. Then returning to step n3, the information processing apparatus 11 waits for input again.

If the key operated at step n4 is OFF key 27, the operation advances to step n7.

This information processing apparatus 11 possesses a so-called auto-power-off function, and when key operation is not done at step n3, the operation advances to step n6. If key operation is not done for a specified time in the input waiting state of the information processing apparatus 11, the operation changes from step n6 to step n7, and the information processing apparatus 11 is in power interrupted state at step n7 as described below.

At step n7, the line l1 is cut off. That is, the supply voltage $-V_s$ given from the power supply 20 to the processing circuit 14 and level converter 33 is cut off, and this information processing apparatus 11 is in power interrupted state. At this time, the supply voltage $-V_s$ is applied to the regulator 32 from the power supply 20 through the line l2, and the action of the clock circuit 19 is maintained by the voltage $-V_L$ delivered from the regulator 32 to the line l3.

In such electric circuit 31, a voltage $-V_L$ generated from the regulator 32 is given to the clock circuit 19 which must be operated even when the power is cut off. Accordingly, the power consumption in the power interrupted state is particularly saved. Meanwhile, the output signal from the clock signal 19 which is operated at the voltage $-V_L$ is converted by the level converter 33 into a level suitable to be fed into the processing circuit 14, and hence the signal can be fed and delivered securely.

In the foregoing embodiment, this invention is applied in the information processing apparatus 11, but this invention may be related also to any other electronic apparatus as far as it contains an always operating circuit and a circuit containing a non-operating period.

In the embodiment explained so far, the power supply 20 delivers a voltage between the grounding potential and negative potential, and each circuit of the electric circuit 31 is energized with a negative voltage, but it is the same if the power supply 20 delivers a voltage between the grounding potential and a positive potential, and each circuit is energized with a positive voltage.

This invention may be embodied in various other forms without departing from the true spirit and scope thereof. Therefore, the embodiment mentioned herein is a mere illustrated example in every respect, and the scope of the invention is as mentioned in the claims thereof, and is not limited by the text of the specification thereof.

Furthermore, the modifications and changes belonging to the uniform range of the scope of the claims are all within the scope of the invention.

What is claimed is:

1. An electric circuit comprising:
   a power supply operable to provide electric power;
   power reducing means for reducing the electric power from the power supply operatively connected to the power supply;
   a first operating circuit for delivering a signal, said first operating circuit always energized with the electric power from the power reducing means and being operatively connected to the power reducing means;
   level converting means for converting the signal from the first operating circuit to increase the signal's crest value, energized with electric power from the power supply; and
   a second operating circuit for operating in response to a signal from the level converting means, energized for operation with electric power from the power supply in one period of time, and not energized or operation with electric power from the power supply in another period of time, the one and another periods of time being different time periods.

2. An electric circuit as claimed in claim 1, wherein the level converting means is responsive to the second operating circuit and changes from an operating state to a non-operating state as the second operating circuit is energized and not energized.

3. An electric circuit as claimed in claim 1 or 2, wherein the first operating circuit is a clock circuit which always operates to clock the time.

4. An electric circuit as claimed in claim 1 or 2, wherein the power reducing means is constant voltage generating means, which constant voltage generating means comprises:
   means for generating a reference voltage;
   means for detecting a voltage applied to the first operating circuit;
   means for changing an impedance in response to a control signal, placed between the power supply and second operating circuit; and
   a comparator circuit for responding to an output of the reference voltage generating means and the output from the voltage detecting means and for sending a control signal to an impedance changing means so as to vary the impedance.

5. An electric circuit as claimed in claim 1 or 2, wherein the level converting means comprises:
   a switching element for conducting or cutting off in response to the signal from the first operating circuit; and
   an impedance element connected in series to the switching element,
   a series circuit composed of the switching element and the impedance element being connected to the power supply, and an output at a connection point of the switching element and impedance element being applied to the second operating circuit.

6. An electric circuit comprising:
   a single power supply operable to provide electric power;
   power reducing means for reducing the electric power from the power supply;
   a first operating circuit which is always energized with the electric power from the power reducing means and delivers a signal, said first operating circuit operatively connected to the power reducing means; and
   a second operating circuit for operating in response to a signal from the first operating circuit, energized with an electric power from the power supply in one period of time, and not energized with electric power from the power supply in another period of time, the one and another periods of time being different time periods.

7. An electric circuit as claimed in claim 3, wherein the power reducing means is constant voltage generating means, which constant voltage generating means comprises:
   means for generating a reference voltage;
   means for detecting a voltage applied to the first operating circuit;
   means for changing an impedance in response to a control signal, placed between the power supply and second operating circuit; and a comparator circuit for responding to an output of the reference voltage generating means and the output from the voltage detecting means and for sending a control signal to an impedance changing means so as to vary the impedance.

8. An electrical circuit as claimed in claim 3, wherein the level converting means comprises:

a switching element for conducting or cutting off in response to the signal from the first operating circuit; and an impedance element connected in series to the switching element, a series circuit composed of the switching element and the impedance element being connected to the power supply, and an output at a connection point of the switching element and impedance element being applied to the second operating circuit.

9. The electrical circuit as claimed in claim 1 or 2, wherein the power reducing means is constant voltage generating means, which constant voltage generating means comprises:

means for generating a reference voltage;

means for detecting a voltage applied to the first operating circuit;

means for changing an impedance in response to a control signal, placed between the power supply and second operating circuit; and a comparator circuit for responding to an output of the reference voltage generating means and the output from the voltage detecting means and for sending a control signal to an impedance changing mans so as to vary the impedance.

10. The circuit of claim 6, wherein a power voltage supplied to the first operating circuit is less than the power voltage supplied to the second operating circuit.

* * * * *